United States Patent
Kühner et al.

(10) Patent No.: US 6,694,798 B2
(45) Date of Patent: Feb. 24, 2004

(54) METHOD FOR DETERMINING A FRICTION VALUE

(75) Inventors: Karl Kühner, Friedrichshafen (DE); Manfred Sieger, Friedrichshafen (DE); Jörg Geis, Markdorf (DE); Andreas Schwarz, Langenargen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 10/182,273

(22) PCT Filed: Feb. 24, 2001

(86) PCT No.: PCT/EP01/02106
§ 371 (c)(1),
(2), (4) Date: Jul. 25, 2002

(87) PCT Pub. No.: WO01/65227
PCT Pub. Date: Sep. 7, 2001

(65) Prior Publication Data
US 2003/0000283 A1 Jan. 2, 2003

(30) Foreign Application Priority Data
Mar. 1, 2000 (DE) .......................... 100 09 860

(51) Int. Cl.$^7$ .............................................. G01N 19/02
(52) U.S. Cl. ................................................... 73/9
(58) Field of Search .............................. 73/9; 192/85 R, 192/147

(56) References Cited

U.S. PATENT DOCUMENTS 5,752,592 A  5/1998  Mori ..................... 192/85 R
5,795,265 A  8/1998  Domian et al. ............. 477/143

FOREIGN PATENT DOCUMENTS

| DE | 43 04 596 A1  | 8/1994  | .......... F16H/61/14 |
| DE | 196 20 328 A1 | 11/1997 | .......... B60K/23/00 |
| EP | 0 709 602 A2  | 5/1996  | .......... F16H/61/06 |
| EP | 0 770 195 B1  | 12/1998 | .......... F16H/61/06 |
| WO | 97/44600      | 11/1997 | .......... F16H/61/20 |

*Primary Examiner*—Hezron Williams
*Assistant Examiner*—Charles D Garber
(74) *Attorney, Agent, or Firm*—Davis & Bujold, PLLC

(57) ABSTRACT

The invention is based on a process for determination of a coefficient of friction ($\mu$) of a hydraulically activated coupling (4, 5, 6) or brake (7, 8, 9) in a load-shifting transmission (1). It is proposed that a drive shaft (14) of the transmission (1) be driven with a specified torque (T), that an output shaft (15) of the transmission (1) is blocked with a closed coupling (4, 5, 6) or brake (7, 8, 9) during a calibration run, the activation pressure (p) of coupling (4, 5, 6) or brake (7, 8, 9) is reduced in accordance with a specified course over time, the differential rotational speed ($\Delta$n) between the input (17, 18, 19) and the output (20) of the coupling (4, 5, 6) or brake (7, 8, 9) is recorded, the activation pressure (p) is ascertained in which the differential rotation speed ($\Delta$n) is greater than zero and a separation coefficient of friction ($\mu_{separation}$) is computed on the basis of torque (T), activation pressure (p) and a construction-conditioned coupling constant. By ascertaining the coefficient of friction $\mu$, the shifting can be conducted over the lifetime of the transmission (1) with a constant shift quality.

4 Claims, 2 Drawing Sheets

METHOD FOR DETERMINING A FRICTION VALUE

FIELD OF THE INVENTION

The invention concerns a process for determining a coefficient of friction.

BACKGROUND OF THE INVENTION

A process for controlling an automatic transmission driven by an internal combustion engine is known from EP 0 770 195 B1 where one shifting takes place from a first into a second gear ratio in that a first clutch opens and a second clutch closes. A brake through which the torque of the drive element can be supported on the transmission housing can also replace a clutch. An electronic control device controls the pressure distribution of the first and second clutch during the shifting process through electromagnetic valves. It determines a first and a second type of shifting on the basis of input magnitudes whereby the first type of shifting is a traction up shift or a reverse thrust and the second type of shifting is a reverse in up shift or an up shift in traction. The shifting procedures are conducted in the two types of shifting such that a filling compensation phase is joined with a rapid filling phase of the hydraulic actuation elements and a load assumption and is then followed by a closing phase. In the first type of shifting, a gradient assumption phase with a slipping phase follows the load assumption phase, and a gradient reduction phase precedes the closing phase. In the second type of shifting, a gradient adjusting phase follows the filling compensation phase and a gradient degradation phase occurs before the load assumption phase.

For a fast, jolt-free shifting, it is important that the point, at which the clutch or brake are just still or just already are transmitting a load moment, can be rapidly triggered. This point is dependent upon the coefficient of friction and the coefficient of friction course of the clutch. It is therefore important for shift quality to know the current coefficient of friction of the clutch or brake as accurately as possible and to use it as a basis for control or regulation. Especially with a torque-based, analytic load shifting process, the torque-pressure connection must be known for the entire gear shifting.

For multiple transmissions, especially construction machine transmissions, a great number of oils is available. Since the coefficient of friction of the clutch or brake changes as a function of the type of oil, new oil types must be determined for each transmission. If the manufacturer of construction machines or a workshop pours in different oil than has been prescribed, the shifting quality worsens. The coefficient of friction can also alter in the course of time through wear and tear and aging. If the moment-pressure relation no longer fits, a racing of the turbine of a hydrodynamic converter connected upstream in series or distortion of a transmission is possible A calibration procedure for couplings in a transmission is known from EP 0 709 602 B1. The couplings serve for selective connection of an input shaft, an output shaft and a large number of gears with one another in order to bring about a change in the gear step through a selective engagement of the couplings. The process includes the following steps: Restraining the output shaft against rotation, determining a reference rotational speed for the input shaft, application of a hydraulic pressure enlargement step value to a selected coupling, measuring the rotational speed of the input shaft at the time following the application step, comparison of the input rotational speed at the time with the reference rotational speed after the measurement step, repeating the steps of application, measurement and comparison until the rotational speed of the input shaft at the time is smaller than the reference rotational speed, through which it is shown that the input shaft is subjected to stress, storage of a value which corresponds to the hydraulic pressure which is necessary at the beginning of the stressing of the input shaft in the electric control system. The point of load assumption is indeed determined through the known procedure in that the allocated activation pressure is defined. But no coefficient of friction is determined, which is important for the entire sequence, especially for the gradient adjustment phase of a torque-based analytic load shifting.

Underlying the invention is the objective of again detecting the coefficient of friction of clutches or brakes in a load-shifting transmission under altered operating conditions with as little expenditure as possible.

SUMMARY OF THE INVENTION

According to the invention, a drive shaft of the transmission is driven at a given torque while a driving shaft of the transmission is blocked in the event of a closed clutch or when the brake is blocked during a calibration run. Moreover, the activation pressure of the coupling (clutch or brake) is reduced in accordance with a specified course of time. At the same time, the differential rotation speed between input and output of the clutch or brake is recorded, for example in that the differential rotational speed of the drive shaft to the output shaft is measured. At the time at which the differential rotational speed is greater than zero, the activation pressure is recorded, and a separation coefficient of friction is calculated on the basis of the associated torque, the activation pressure and a construction-conditioned clutch constant.

The coefficient of friction of the coupling lining which is a function of the differential rotational speed, results from the following relationship:

Coefficient of friction $\mu$=activation pressure p*torque T/coupling constant where the coupling constant is the product of the coupling friction area, the friction area figure and the friction radius of the coupling. It arises through the construction of the respective coupling or brake and does not change during the lifetime or on the basis of different transmission oils.

In addition to the separation coefficient of friction which is characteristic for the opening coupling or brake, it is appropriate to determine the dynamic coefficient of friction as well, which is characteristic for the closing coupling or brake. For this, an output shaft of the transmission is blocked with an opened coupling or brake during a calibration run. The coupling or brake is acted upon with a constant activation pressure following a rapid filling. Moreover, the progress of the differential rotational speed between the input and the output of the coupling or brake, and furthermore the course of torque over time, are recorded on a drive shaft of the transmission. This time though, a dynamic coefficient of friction is once again calculated on the basis of construction-conditioned coupling constants, the activation pressure and the allocated torque which applies for sliding friction as long as the differential rotational speed is not equal to zero.

With the aid of the coefficients of friction ascertained, which are appropriately deposited in a memory module of a transmission control unit, the shift quality of the load-shifting transmission can be held constant under various operating conditions and with different transmission oils over its lifetime.

In order that the process of the invention is constantly available, it is provided in accordance with a configuration of the invention that it is deposited as software in a memory module of a transmission control unit and runs automatically following fetching. This can take place, for example, in a parked vehicle with parking brakes applied. Instead of the transmission control unit, obviously any suitable control unit of a vehicle or processing machine can be used. Furthermore, it is appropriate for the ascertained coefficients of friction to be assumed by the transmission control unit automatically.

BRIEF DESCRIPTION OF THE DRAWINGS

The invention will now be described, by way of example, with reference to the accompanying drawings in which.

DETAILED DESCRIPTION OF THE INVENTION

Figure 1A:
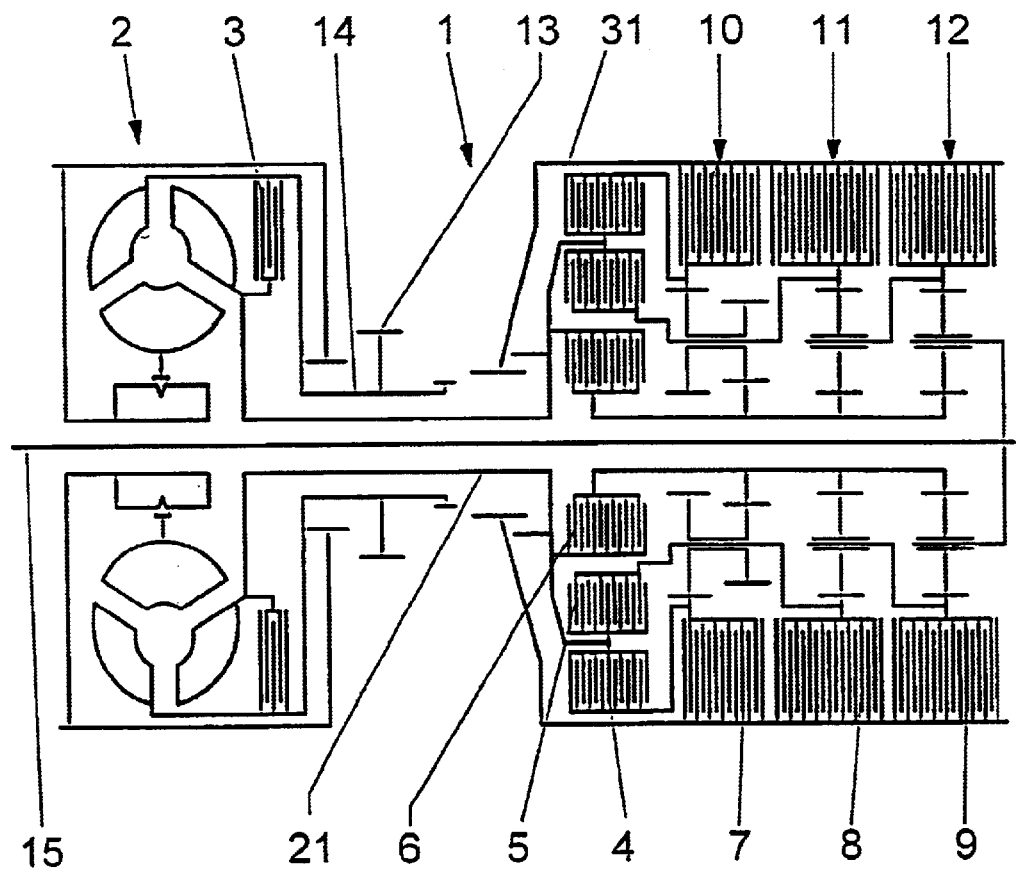
FIGS. 1A and 1B are a transmission plan of a multiple gear, load-shifting transmission with an electronic control unit.
Figure 1B:
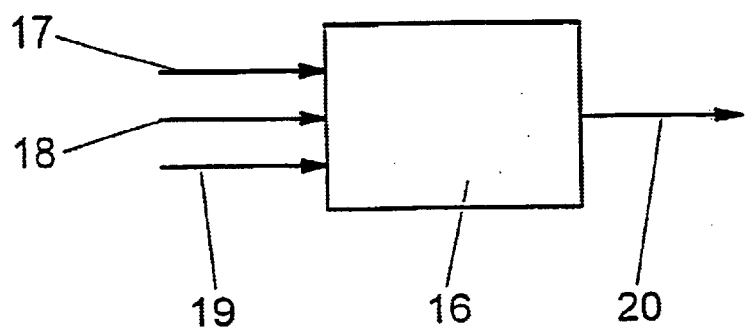

The represented load-shifting transmission 1 is an automatic transmission with a hydrodynamic converter 2 which is driven by a driving pinion 13 and a drive shaft 14 and which drives the change-speed gear connected in series downstream in planetary manner through a hollow shaft 21. The converter 2 can be bridged over with a bypass transmission 3 which is arranged between the drive shaft 14 and hollow shaft 21.

The change-speed gear includes three planetary sets 10, 11, 12, the gears and planetary supports of which can be connected with the hollow shaft 21 and an output shaft 15 or with a transmission housing 31 through three clutches 4, 5, 6 and three brakes 7, 8, 9 (collectively couplings), that result in several forward and reverse gears.

The transmission 1 has a transmission control unit 16 through which the individual shifts are conducted as a function of operating and driving parameters corresponding to shift programs deposited in the memory modules. The transmission control unit at the same time serves to ascertain a coefficient of friction $:\mu_{separation}, :\mu_{dynamic}$. For this purpose, it has an input 17 for recording the progress of a differential rotational speed $\Delta n$ of one of the couplings 4, 5, 6 or the brakes 7, 8, 9, an input 18 for recording an activation pressure p of the switching elements mentioned, an input 19 for recording a torque T, for example, on a drive shaft 14 and an output 20, on which a coefficient of friction $\mu$ runs through the time t corresponding to is issued which is calculated on the basis of the input signals in connection with a coupling constant which is deposited with the program of invention in a memory module of the transmission control unit 16.

In order to ascertain the separation coefficient of friction $:\mu_{separation}$ of a coupling 4, 5, 6 or brake 7, 8, 9, the power train in which the coupling 4, 5, 6 or brake 7, 8, 9 in question lies connected and the drive shaft 14 is driven with a specified torque T while the output shaft 15, for example, is blocked by a parking brake, which is not represented. The activation pressure p of coupling 4, 5, 6 or brake 7, 8, 9 is thereupon reduced according to a specified course over time. At the same time, the differential rotational speed $\Delta n$ between the input and the output of coupling 4, 5, 6 or brake 7, 8, 9 is recorded. At that time, the separation point, when the differential rotational speed $\Delta n > zero$, the activation pressure p is ascertained, and the separation coefficient of friction $:\mu_{separation}$ is calculated from it with torque T and a construction-conditioned coupling constant.

Figure 2:
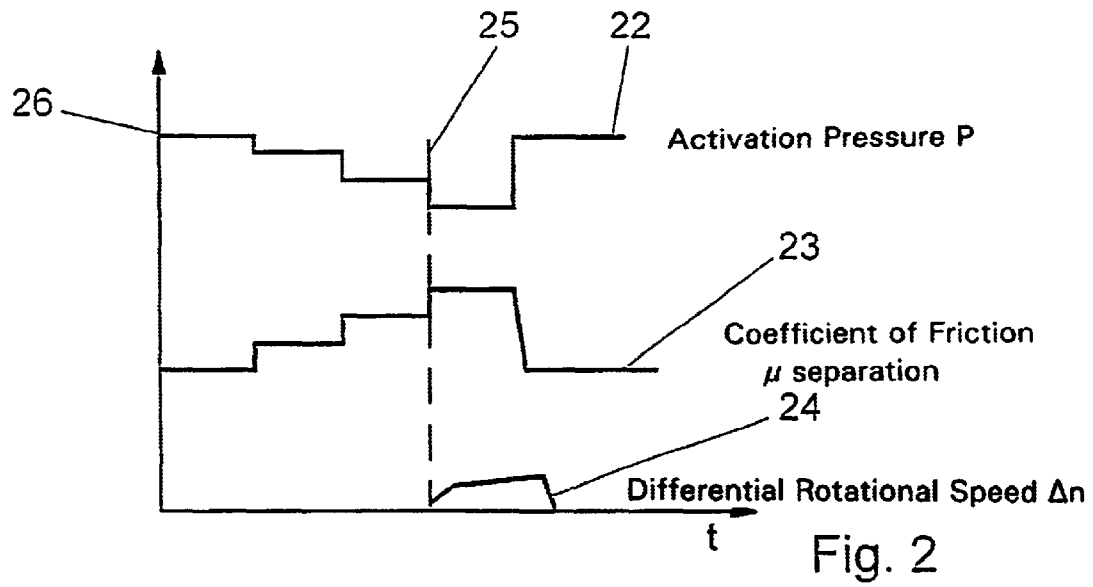
FIG. 2 is a diagram for ascertaining a separation coefficient of friction and FIG. 3 is a diagram for ascertaining a dynamic coefficient of friction.

FIG. 2 shows a characteristic curve 22 over time t, which marks the course of activation pressure p which drops incrementally up to the separation point 25. At the separation point 25, the differential rotational speed $\Delta n$, which is represented by characteristic curve 24, is greater than zero. The coefficient of friction p computed by the transmission control unit runs over time t in accordance with characteristic curve 23. Its value at the separation point 25 is recorded as the separation coefficient of friction $:\mu_{separation}$ and deposited in a memory module of the transmission control unit 16.

Figure 3:
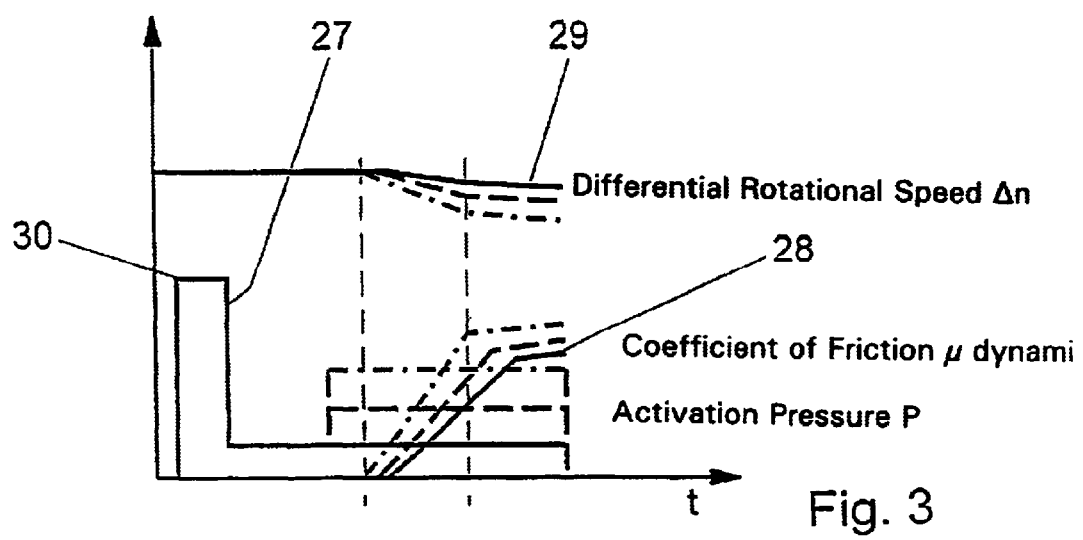

In order to ascertain the dynamic coefficient of friction of a coupling 4, 5, 6 or a brake 7, 8, 9, the coupling 4, 5, 6 or brake 7, 8, 9 is first of all opened in the power train of the transmission 1. In FIG. 3, the course of the activation pressure p of the coupling 4, 5, 6 or brake 7, 8, 9 to be examined is represented by a characteristic curve 27. First a filling pressure 30 is applied that goes in operation during a rapid filling phase. It is then followed by a filling compensation phase after which the coupling 4, 5, 6 or brake 7, 8, 9 is subjected to a constant activation pressure p. At the same time, the differential rotational speed $\Delta n$ between the input and the output of the coupling 4, 5, 6 or brake 7, 8, 9 or the drive shaft 14 and the blocked output shaft 15 to be examined is monitored. As soon as the differential rotational speed $\Delta n$ falls, the coefficient of friction $\mu$ is calculated on the basis of the activation pressure p and the current torque T on the drive shaft 14 of the transmission control unit 16 and deposited in a memory module of the transmission control unit.

FIG. 3 depicts the temporal course of the dynamic coefficient of friction $\mu_{dynamic}$ as a characteristic curve 28. The corresponding characteristic curves 28 and 29 are represented in dotted and dash-dot lines, which result when the activation pressure p is elevated during its constant phase corresponding to the specified amounts corresponding to the likewise dotted or dash-dot lines.

Reference Numbers

1 Transmission [power train]
2 Hydrodynamic converter
3 Bypass transmission
4 Coupling
5 Coupling
6 Coupling
7 Brake
8 Brake
9 Brake
10 Planetary set
11 Planetary set
12 Planetary set
13 Driving pinion
14 [Axle] drive shaft
15 [Output] drive shaft
16 Transmission control unit
17 Input
18 Input
19 Input 20 Output
21 Hollow shaft
22 Characteristic curve
23 Characteristic curve
24 Characteristic curve
25 Separation point
26 Initial pressure
27 Characteristic curve
28 Characteristic curve
29 Characteristic curve
30 Filling pressure
31 Transmission housing
$\mu_{separation}$ Coefficient of friction
$\mu_{dynamic}$ Coefficient of friction
$\Delta n$ Differential rotational speed
p Activation pressure
T Torque
t Time

What is claimed is:

1. A process for determining a coefficient of friction ($\mu$) of a hydraulically activated coupling (4, 5, 6 or 7, 8, 9) in a load-shifting transmission (1), comprising:

driving a drive shaft (14) of the transmission (1) at a specified torque (T);

blocking an output shaft (15) of the transmission (1) with a closed coupling (4, 5, and 6 or 7, 8, and 9) during the calibration run;

reducing the activation pressure (p) of coupling (4, 5, 6 or 7, 8, 9) in accordance with a specified course over time;

recording the differential rotational speed ($\Delta n$) between the input (17, 18, 19) and the output (20) of the coupling (4, 5, 6 or 7, 8, 9);

ascertaining the activation pressure (p) at which the differential rotation speed ($\Delta n$) is greater than zero; and computing a separation coefficient of friction ($\mu_{separation}$) on the basis of torque (T), activation pressure (p) and a construction-conditioned clutch constant.

2. The process of determining a coefficient of friction ($\mu$) of a hydraulically activated coupling (4, 5, 6 or 7, 8, 9) in a load-shifting transmission (1), comprising blocking an output shaft (15) of the transmission (1) with an opened coupling (4, 5, 6 or 7, 8, 9) during a calibration run;

acting on the coupling (4, 5, 6 or 7, 8, 9) with a constant activation pressure (p) after a rapid filling;

recording over the course time of the differential rotational speed ($\Delta n$) between the input (17, 18, 19) and the output (20) of the coupling (4, 5, 6 or 7, 8, 9);

recording over the course time of torque (T) on a drive shaft (14) of the transmission (1), calculating a dynamic coefficient of friction ($\mu_{dynamic}$) on the basis of a construction-conditioned clutch constant, the activation pressure (p) and the allocated torque (T).

3. The process according to claim 1, wherein the coefficient of friction ($\mu$) is deposited as software in a memory module of a transmission control unit (16) and runs automatically after being called in.

4. The process according to claim 1, wherein the ascertained coefficients of friction ($\mu_{separation}$, $\mu_{dynamic}$) are automatically assumed by the transmission control unit (16).

* * * * *